E. T. COVELL.

Metallic Vessel.

No. 7,942. Reissued Nov. 13, 1877.

Witnesses:

E. A. Dick

D. P. Cowl

Inventor:

Edward T. Covell by A. Pollok his Attorney.

N. PETERS, PHOTO-LITHOGRAPHER, WASHINGTON, D. C.

UNITED STATES PATENT OFFICE.

EDWARD T. COVELL, OF NEW BEDFORD, MASSACHUSETTS.

IMPROVEMENT IN METALLIC VESSELS.

Specification forming part of Letters Patent No. 167,504, dated September 7, 1875; Reissue No. 7,942, dated November 13, 1877; application filed October 23, 1877.

*To all whom it may concern:*

Be it known that I, EDWARD T. COVELL, of New Bedford, Massachusetts, have invented certain new and useful Improvements in Metallic Vessels, of which the following is a specification:

This invention relates particularly to metallic cans or vessels that have sunken heads or ends. In vessels of this description the projecting edges are very liable to be bent and broken, to the permanent injury of the vessel.

To remedy this defect I combine with the sunken head or end an outer head, which fills the space between the sunken head or end and the projecting edges of the can-body. This outer head is preferably made of wood, and I prefer to unite it with the can-body by making it of a thickness somewhat less than the height of the projecting edges, and bending these edges inwardly down upon it after it has been placed in position. I also, in the preferred mode of constructing the heads, make use of an exterior metallic covering-plate, which is placed on the wooden head before its edges are bent down, as aforesaid.

In the accompanying drawings I have indicated a way of carrying my invention into effect.

Figure 1:
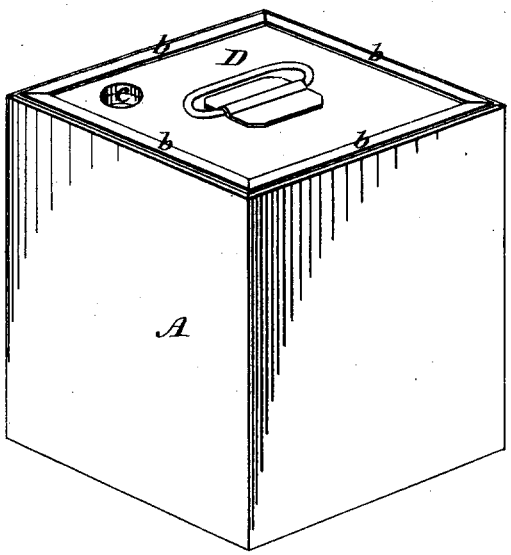
Figure 2:
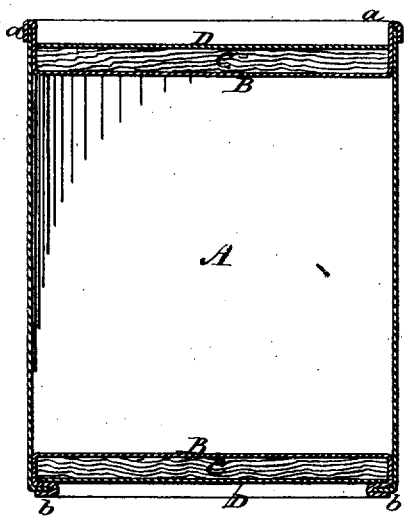

Figure 1 is a perspective view of a can embodying my improvement, and Fig. 2 a vertical central section of the same.

A is the body of the can; B, the sunken head; C, the wooden filling or outer head, and D the external covering-plate.

To put the parts of the can together, I proceed as follows: The can-body is made of straight unbent edges at the ends. On its ends are placed the sunken heads, which fit down within the can-body, and are of such size that their outer edges may be bent down over and upon the exterior of the ends of the can-body, as shown at *a*, Fig. 2. One of the heads is formed with a filling-orifice, punched or cut in it before the head is applied to the body. Above the sunken head there is placed the outer head or filling C, of wood or other suitable material, which fits within the projecting edges of the can, and is of a thickness somewhat less than the height of those edges. Upon the wooden filling is placed a metal plate or shield, D. The upper end of the can in Fig. 2 represents the parts in the position above described.

To complete the formation of the heads or ends, the projecting edges of the can are cut down at the corners to the surface of the head. They are then cut off at each end, or at the points corresponding to the corners of the can, so that when turned over on the heads they will form a miter. They are then pressed or otherwise bent inwardly down upon the parts C D, as represented at *b* in Figs. 1 and 2, thus firmly securing said parts in place, and making a strong and tight head.

The wooden head and external metal blank are formed, as indicated at *c*, with orifices, which register with the orifice formed in the sunken head. After the heads or ends are thus made, they are dipped into molten solder for the purpose of sealing the joints. The heads are so formed that there is no danger of their springing off during this operation.

Cans or other metallic vessels have been made with internal wooden heads; but such vessels are objectionable for liquids, for the reason that the wooden heads absorb and give color and taste to the same.

Under my invention the wooden heads are completely isolated from contact with the contents of the vessel. I am also enabled to use much lighter and cheaper stock than otherwise would be practicable, and to dispense, during the turning down upon the heads of the flanges, with internal mandrels, or other equivalent means for the inside support of cans, whereby but one head could be applied and secured.

By my mode of uniting the heads with the body of the can both heads can be put on, and secured by a turn-over flange.

Having thus described my said invention, and the manner in which the same is or may be carried into effect, what I claim, and desire to secure by Letters Patent, is—

1. The method of uniting the heads or ends with the body of metallic cans or vessels by forming upon the heads upright flanges at right angles, which are turned over the sides of the body of the can and bent inwardly upon the heads, whereby the use of internal mandrels or inside supports may be dispensed with, and both heads secured to the body by the same means and same manner, substantially as set forth.

2. A metallic can or vessel the heads or ends of which are united with the body thereof by means of a flange bent down inwardly on the top and bottom heads, said flange being formed by the turning of the head-flange over the side of the can-body, substantially as herein shown and set forth.

3. In a metallic vessel, the combination of a sunken metallic head or end, an outer head or filling-piece, and projecting edges formed by the can-body and sunken head, and inwardly bent down upon the outer head or filling-piece, as and for the purposes described.

4. The combination, in a metallic can or vessel, of the following elements, namely: a sunken metallic head or end, an outer wooden head or filling-piece, an external covering metallic plate, and projecting edges inwardly bent upon said covering-plate, substantially as shown and described.

In testimony whereof I have hereunto signed my name this 27th day of August, A. D. 1877.

EDWARD T. COVELL.

Witnesses:
CHARLES C. SAYER,
EDWARD A. SAYER.